United States Patent
Boezen et al.

(10) Patent No.: US 6,512,308 B2
(45) Date of Patent: Jan. 28, 2003

(54) FAULT TOLERANT AIR BAG BUS SYSTEM WITHOUT TRANSFORMER

(75) Inventors: Hendrik Boezen, Nijmegen (NL); Aloysius Johannes Maria Boomkamp, Nijmegen (NL); Martinus Bredius, Santa Clara, CA (US); Peter Buehring, Hamburg (DE); Patrick Willem Hubert Heuts, Nijmegen (NL); Abraham Klaas Van Den Heuvel, Nijmegen (NL); Egon Joehnk, Norderstedt (DE); Maarten Teunis Visser, Nijmegen (NL); Ruurd Anne Visser, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1 day.

(21) Appl. No.: 09/837,947

(22) Filed: Apr. 19, 2001

(65) Prior Publication Data

US 2001/0054846 A1 Dec. 27, 2001

(30) Foreign Application Priority Data

Apr. 19, 2000 (EP) ............................................. 00201396

(51) Int. Cl.$^7$ ................................................ B60R 21/32
(52) U.S. Cl. ........................ 307/10.1; 307/121; 280/735
(58) Field of Search ................................ 307/9.1, 10.1, 307/121; 280/735; 701/45–47

(56) References Cited

U.S. PATENT DOCUMENTS

| 5,420,790 A | * | 5/1995 | Ravas et al. ................. 180/282 |
| 5,734,317 A | * | 3/1998 | Bennett et al. ............. 280/734 |
| 5,936,313 A | * | 8/1999 | Cook et al. .................. 180/282 |

* cited by examiner

Primary Examiner—Fritz Fleming
(74) Attorney, Agent, or Firm—Russell Gross

(57) ABSTRACT

A fault tolerant air bag system needs a floating supply, which supply conventionally is made by means of a DC-DC converter with a transformer. By splitting the main energy reserve capacitor (14) into two capacitors (14, 34), and coupling one of the capacitors (34) to the other (14) by means of switches (36, 38) which open during a crash, no transformer is needed any more.

2 Claims, 2 Drawing Sheets

FAULT TOLERANT AIR BAG BUS SYSTEM WITHOUT TRANSFORMER

BACKGROUND OF THE INVENTION

The invention relates to air bag systems for cars. FIG. 1 shows a conventional air bag system consisting of a number of firing stages 2, 4, a microcontroller 6 and a crash sensor 8. The firing stages 2, 4 switch ignition currents through squibs 10, 12 to fire the air bag at the appropriate time during a crash of the car. A high number of squibs requires a large number of wires, since two wires per squib are needed. Short circuits of these wires to ground or the battery voltage may cause unwanted firing of the airbags.

During a crash the electric connections to the car battery may be lost. Therefore all air bag systems contain an energy reserve capacitor (ERC)14 to keep the system operating for a limited time during the crash. This ERC capacitor 14 is charged to a relatively high voltage, for example 30 V, by means of a set up converter 16 which converts the 12 V battery voltage of the battery 18 to the high voltage. The high voltage is used to supply the firing stages 2, 4. A step down converter 20 converts the high voltage to a working voltage, usually 5 V, for the microcontroller 6 and the crash sensor 8.

FIG. 2 shows a conventional networked air bag system which uses a two-wire firing bus which connects multiple smart squibs 22, 24 to a bus driver 26. The two wires carry the data transmission signal and the power supply to the smart squibs 22, 24. The squibs 10, 12 are the igniters which actually fire the air bags. The energy for firing the squib is stored in a local capacitor inside the smart squibs 22, 24. The energy reserve for firing the squibs is now inside the smart squibs, but still energy reserve is needed for the crash sensor 8 and the microcontroller 6 which controls the bus driver 26.

One of the advantages of a networked air bag system is that a fault on one of the bus wires does not lead to unwanted deployment of a squib. If the whole firing bus is supplied from a floating power supply, the common mode voltage on the bus is undefined. This means that with either bus wire shortened to ground or to the battery voltage the system still operates correctly. To make a floating power supply a DC-DC converter 28 with a transformer 30 is needed. A transformer, however, is an expensive component.

SUMMARY OF THE INVENTION

It is an object of the invention to provide a transformerless air bag system. To this end the invention provides an air bag system as claimed in claim 1. The energy reserve capacitor is split into two parts: a main part to supply the microcontroller and the crash sensor, and a further part to supply the floating bus driver. The further part is connected to the main part by means of switches which open during a crash. The energy content of the further part is enough to supply the bus driver during the crash. The switches disconnect the further part of the energy reserve capacitor and all components connected to it from the rest of the system and thus a floating power supply is created during the crash.

BRIEF DESCRIPTION OF THE DRAWINGS

The above and other objects and features of the present invention will become more apparent from the following detailed description considered in connection with the accompanying drawings in which.

In the Figures corresponding features are denoted by the same reference symbols.

DETAILED DESCRIPTION

Figure 1:
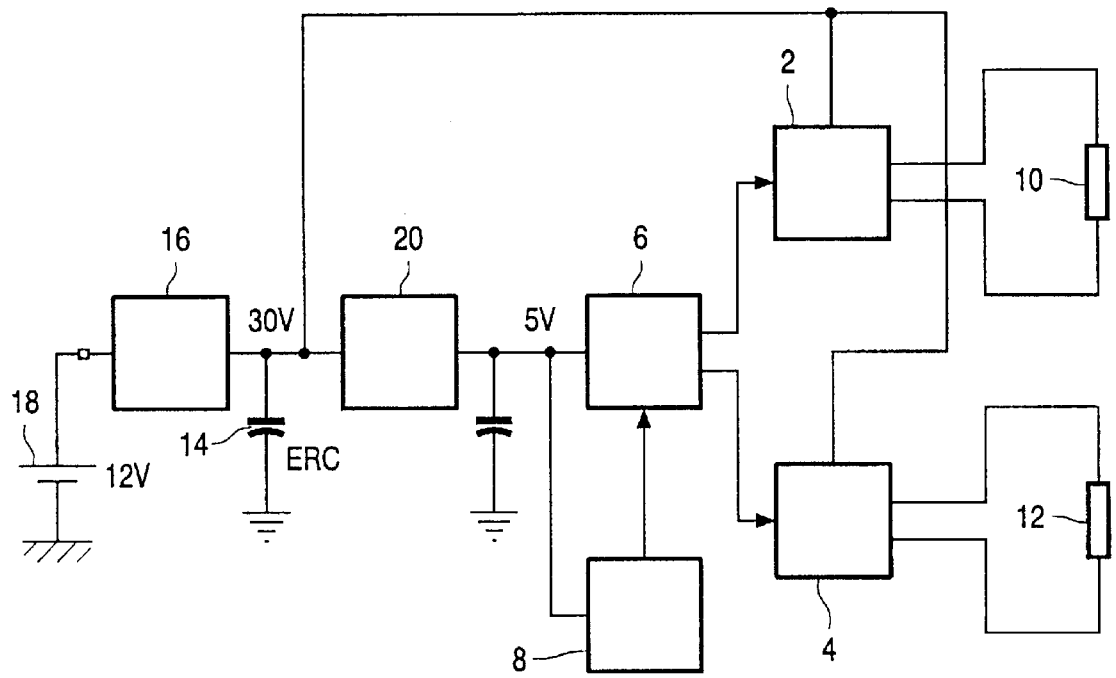
FIG. 1 is a block diagram of a first conventional air bag system.
Figure 2:
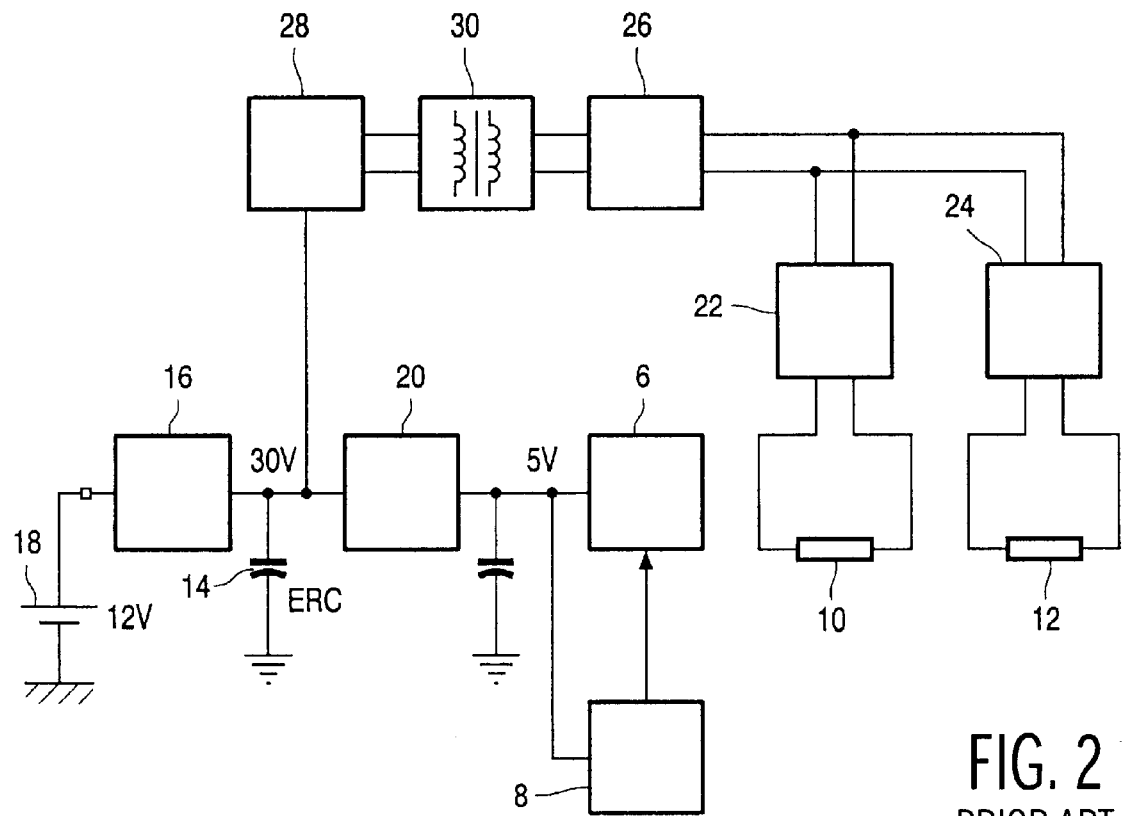
FIG. 2 is a block diagram of a second conventional air bag system.
Figure 3:
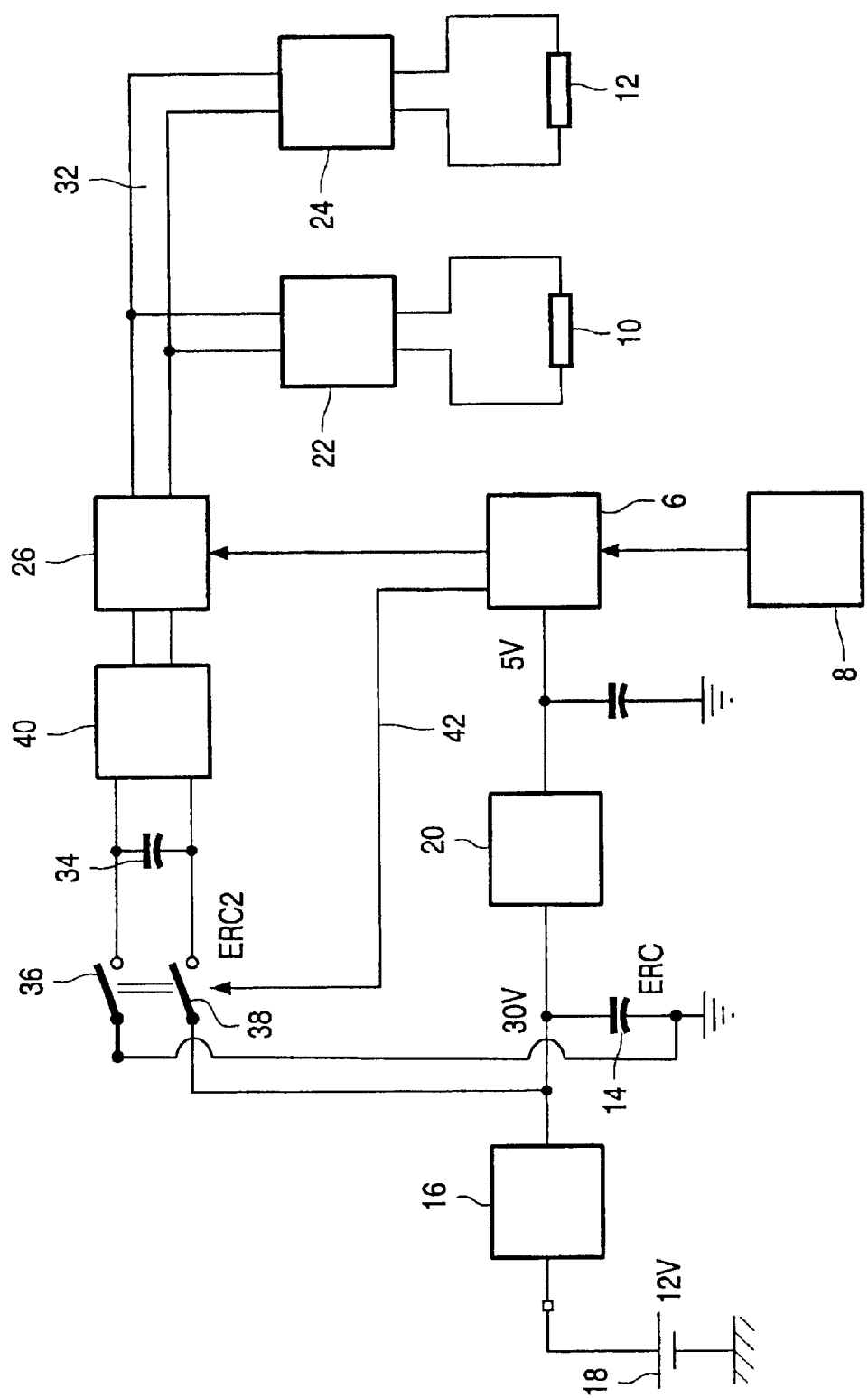
FIG. 3 is a block diagram of an air bag system according to the invention.

FIG. 3 is a block diagram of an air bag system according to the invention. The system has a two-wire firing bus 32 which connects multiple smart squibs 22, 24 to a bus driver 26. The two wires 32 carry the data transmission signal and the power supply to the smart squibs 22, 24. The squibs 10, 12 are the igniters which actually fire the air bags. The energy for firing the squibs 10, 12 is stored in a local capacitor (not shown) inside the smart squibs 22, 24. The energy reserve for firing the squibs 10, 12 is now inside the smart squibs 22, 24. Because during a crash the electric connections to the car battery may be lost, the air bag system has a main energy reserve capacitor (ERC)14 to keep the system operating for a limited time during the crash. This ERC capacitor 14 is charged to a relatively high voltage, for example 30 V, by means of a set up converter 16 which converts the 12 V battery voltage of the battery 18 to the high voltage. A step down converter 20 converts the high voltage to a working voltage, usually 5 V, for the crash sensor 8 and the microcontroller 6 which controls the bus driver 26. The system further has a further energy reserve capacitor 34 connected in parallel to the main energy reserve capacitor 14 by means of two switches 36 and 38 which are normally closed. The relatively high voltage of the further energy reserve capacitor 34 is converted toga working voltage for the bus driver 26 by means of a step down converter 40.

The energy content of the further energy reserve capacitor 34 is enough to supply the bus driver 26 during the crash when the switches 36 and 38 are opened, for example, under control of a control signal 42 from the microcontroller 6. In this way the further energy reserve capacitor 34 and all components connected to it are disconnected from the rest of the system and thus a floating power supply is created during the crash. This means that with either bus wire shortened to ground or to the battery voltage the system still operates correctly.

What is claimed is:

1. An air bag system comprising:

igniters (10, 12) for firing air bags;

a firing bus (32) for interconnecting the igniters (10, 12);

a bus driver (26) for energizing the firing bus (32);

a main energy reserve capacitor (14) for providing a supply voltage to the air bag system;

a further energy reserve capacitor (34) coupled in parallel to the main energy capacitor (14) by means of switches (36, 38) to receive the supply voltage; and a power supply (40) for converting the supply voltage to a working voltage for the bus driver (26).

2. An air bag system as claimed in claim 1, further comprising means (6, 42) for opening the switches (36, 38) in case of a crash.

* * * * *